Figure 1:
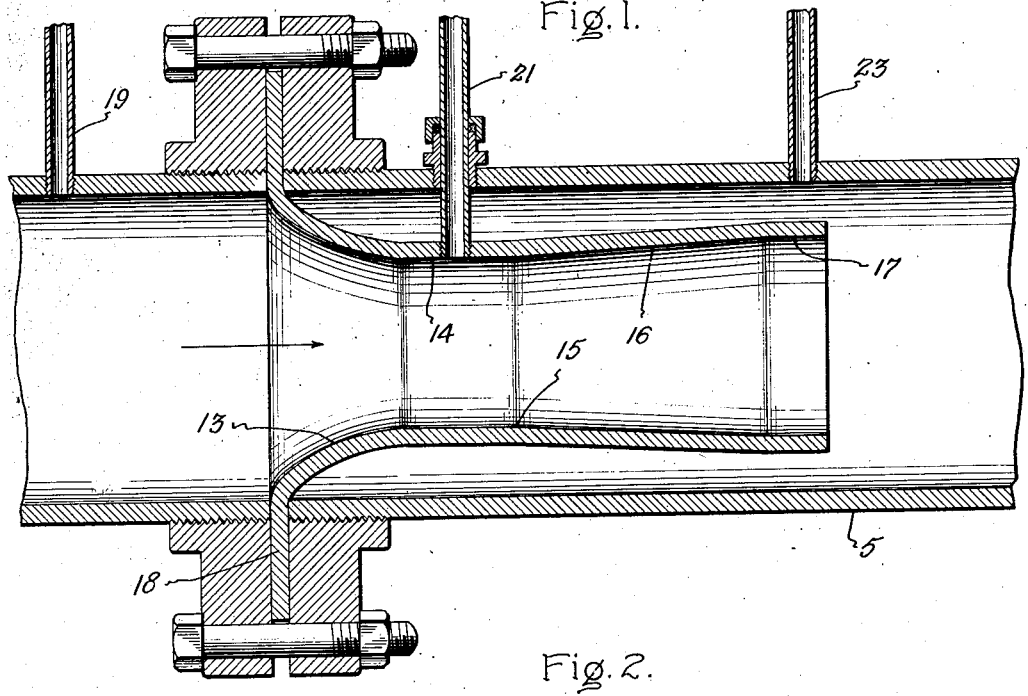

Oct. 27, 1925

1,559,155

C. F. BULLOCK

MULTIRANGE FLOW NOZZLE

Filed Oct. 17, 1924    2 Sheets-Sheet 1

Inventor:
Charles F. Bullock,
by
His Attorney.

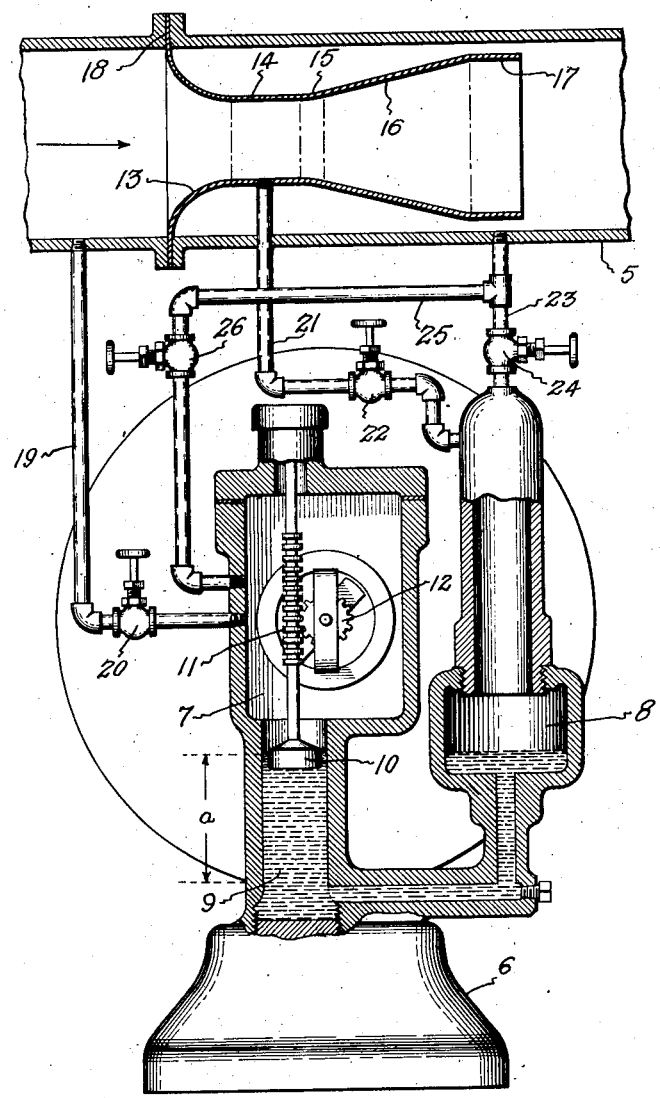

Patented Oct. 27, 1925.

1,559,155

UNITED STATES PATENT OFFICE.

CHARLES F. BULLOCK, OF SCHENECTADY, NEW YORK, ASSIGNOR TO GENERAL ELECTRIC COMPANY, A CORPORATION OF NEW YORK.

MULTIRANGE FLOW NOZZLE.

Application filed October 17, 1924. Serial No. 744,276.

*To all whom it may concern:*

Be it known that I, CHARLES F. BULLOCK, a citizen of the United States, residing at Schenectady, in the county of Schenectady, State of New York, have invented certain new and useful Improvements in Multirange Flow Nozzles, of which the following is a specification.

In connection with flow meters for measuring the flow of fluids through conduits, there is used a pressure difference creating device which creates a pressure difference proportional to the rate of flow, and this pressure difference is measured in order to measure the flow. One form of pressure difference creating device in use is that known as a flow nozzle (see the patent to Dodge, No. 1,298,471, patented March 25, 1919) and my invention relates particularly to a pressure difference creating device of this type.

The pressure difference created with a device of this type varies with the square of the flow. When measuring low velocity flow, the pressure difference to be measured may be quite small, while when measuring high velocity flow the pressure difference may be quite large.

The pressure difference is measured on an instrument of the U-tube type containing an indicating liquid such as mercury, the same comprising leading and trailing legs connected across the flow nozzle, the deflection of the liquid indicating the pressure difference. The deflection measured is usually the deflection in one leg of the U-tube instrument, and, as is well known, the amount of the total deflection in this one leg depends upon the relative areas of the two legs. For different flow conditions, U-tube instruments are provided wherein the legs have different relative areas, the relative areas depending upon the total pressure difference to be handled. In other words, U-tube instruments having legs of different relative areas are provided for different pressure difference ranges. An example of this is well illustrated by the construction shown in the patent to Mapelsden, No. 1,481,921, Jan. 29, 1924. It will be understood that the possible length of the legs of a U-tube is limited in actual practice for manufacturing and mechanical reasons.

The object of the present invention is to provide a flow nozzle construction and arrangement whereby substantially the same pressure difference range may be obtained under different flow conditions, thereby enabling the same U-tube indicating instrument to be used under widely different flow conditions. In this connection it is pointed out that a U-tube indicating instrument for measuring relatively great deflections is not well suited for measuring small deflections because the scale divisions become small and difficult to read and in addition, at small deflections such instruments are not very accurate. It is desirable accordingly, to utilize the total pressure range of the U-tube with the different flow conditions met with.

For a consideration of what I believe to be novel and my invention, attention is directed to the accompanying description and the claims appended thereto.

Figure 2:
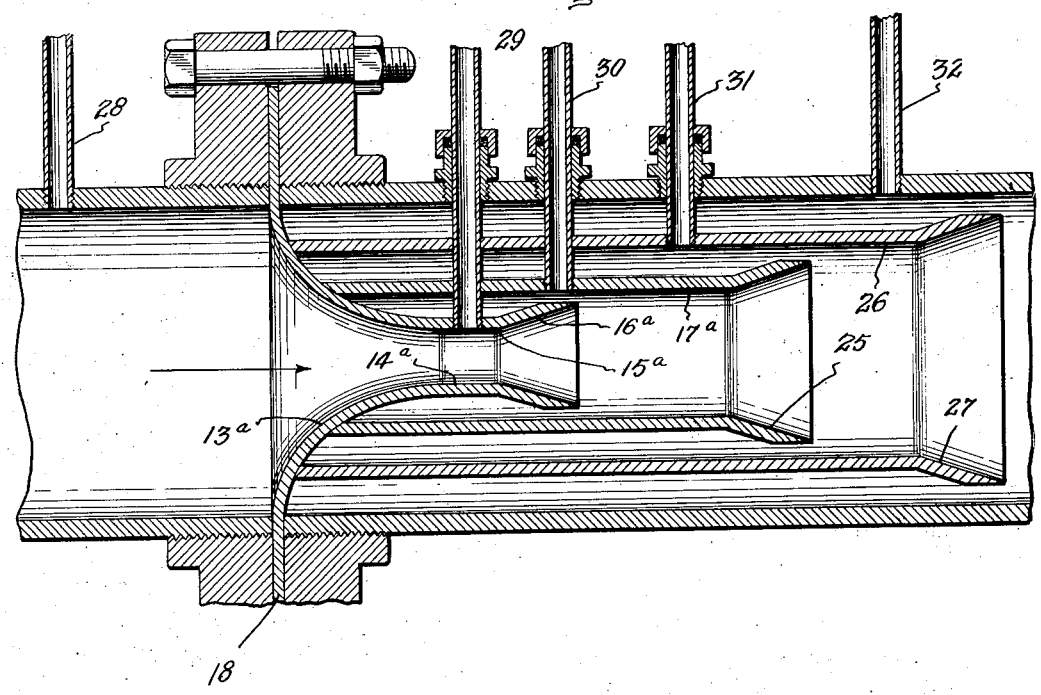

In the drawing, Fig. 1 is a sectional view of a flow tube structure embodying my invention; Fig. 2 is a sectional view of a modification, and Fig. 3 is a diagram of the flow tube structure shown in Fig. 1, the same being shown connected to a U-tube of the type disclosed in the before mentioned Mapelsden patent.

Referring to the drawing, Figs. 1 and 3, 5 indicates a conduit through which a fluid to be metered flows and 6 indicates a pressure difference measuring instrument of the U-tube type such as that disclosed in the before mentioned Mapelsden patent. The leading leg is indicated at 7, the trailing leg at 8 and the indicating liquid at 9. 10 indicates the float which rides on the indicating liquid and actuates the indicating mechanism, such as a pointer, through the rack 11 and pinion 12. This construction is to be taken as typical of any suitable or known indicating instrument of the U-tube type for use in flow meters. In connection with it, it will be noted that the area of leg 8 is larger than that of leg 9 so that the greater portion of the deflection takes place in leg 9 and also that the deflection in leg 9 is limited to substantially the distance $a$. This means that the U-tube is capable of taking care of a certain pressure difference range.

According to my invention, I provide for use with a U-tube instrument of this type a flow nozzle of special construction and arrangement whereby it is capable of being used to produce the same pressure difference range under different flow conditions. For example, take the case of a steam flow meter used for measuring steam for heating purposes. During cold weather a large amount of steam may be required continuously, while during warm weather a smaller amount of steam may be required continuously. If a flow meter is used having a pressure difference creating device adapted for the larger flow conditions, then when smaller flow conditions obtain but a small part of the liquid deflection will be utilized and the meter will not give as accurate results as it would were the total liquid deflection utilized. By my invention I am enabled to utilize the total liquid deflection at times of both large flow and small flow.

The idea broadly of a multi-range pressure difference creating device is not new, but so far as I am aware in constructions heretofore suggested, it has been necessary in each installation to specially calibrate each range of connections, which of course is not practical from a commercial standpoint. By my invention I provide a flow nozzle wherein each set of connections for different ranges has a definite constant whereby the flow nozzle may be installed and used without special calibration, and the construction of my flow nozzle whereby I am enabled to accomplish this result I regard as being the important feature of my invention.

My improved flow nozzle comprises a curved section 13 which faces up stream and merges into a straight section 14 which is of a length equal to at least substantially one-fourth of its diameter and preferably is not longer than its own diameter, the length being such as to straighten the lines of flow and render them parallel. Following this I provide a short curved section 15 having a radius of curvature equal preferably to at least one pipe diameter which merges into a straight flaring section 16, the angle of which is such that it confines the fluid and prevents free expansion. Preferably I utilize an angle of not more than 5 degrees. Flaring section 16 is of a length to bring the tube to the desired diameter, after which it merges into a straight section 17 of a length equal to at least substantially one-fourth of its own diameter.

The flow tube is provided with a flange 18 adapted to be clamped between two adjacent pipe ends.

With the above described arrangement, I obtain three definite pressures, the pressure in advance of the flow tube, the pressure in straight section 14, and the pressure surrounding the straight section 17, and any combination of two of these pressures may be utilized in measuring flow through conduit 5. To this end conduit 5 in advance of the flow tube is connected by a pipe 19 to the leading leg 7 of the U-tube, the pipe being provided with a valve 20; straight section 14 is connected by a pipe 21 containing a valve 22 to the trailing leg 8 of the U-tube, and the region surrounding straight section 17 is connected by a pipe 23 containing a valve 24 to the trailing leg of the U-tube and by a pipe 25 containing a valve 26 to the leading leg of the U-tube. For minimum flow conditions, connection pipes 19 and 21 are utilized because with a given flow the pressure difference created is largest between these two pipes. For maximum flow conditions, either the connection pipes 19 and 23, or 21 and 23, are used dependent on the relative diameters of the pipe 5 and the two straight sections 14 and 17. For intermediate flow conditions, the connection pipes not used for either the maximum or minimum flow conditions are used. That is, pipes 19 and 21 for a given flow give the greatest pressure difference and if, for instance, pipes 19 and 23 are found to give the minimum pressure difference with the given flow, then pipes 21 and 23 will give an intermediate pressure difference with the given flow.

I thus obtain maximum liquid deflection with three different rates of flow whereby I am enabled to measure high, intermediate and low with the same degree of accuracy.

In Fig. 2, I have illustrated a form of flow tube whereby I am enabled to obtain a still greater number of different ranges. In this figure the parts numbered 13$^a$, 14$^a$, 15$^a$, 16$^a$ and 17$^a$ correspond to the parts numbered 13, 14, 15, 16 and 17 in Figures 1 and 3. However, the part 17$^a$ is formed as a sleeve which surrounds parts 14$^a$, 15$^a$ and 16$^a$ in spaced relation to them and at its outer end is provided with a flared portion 25. Surrounding sleeve 17$^a$ I may provide still another sleeve 26 provided with a flared end 27 and as will be clear each additional sleeve provides for an additional number of pressures ranges. The connection pipes to the U-tube instrument are indicated at 28, 29, 30, 31 and 32, and as will be clear by using different pairs of these pipes a large number of pressure ranges may be obtained.

My invention possesses substantial utility from a practical standpoint in that a flow nozzle embodying it, having been calibrated initially and its constants determined, can be used then in any installation to which it is adapted without special or further calibration.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. The combination with a conduit through which a fluid to be metered flows and a pressure responsive instrument having a leading side and a trailing side, of a flow tube in the conduit comprising a converging section followed by a straight section which in turn is followed by a flaring section followed by a straight section, said straight sections having lengths equal substantially to at least one-quarter of their own diameters, and pipes connecting the conduit on the upstream side of the flow tube, the region inside the first straight section, and the region outside the second straight section to said pressure responsive instrument.

2. The combination with a conduit through which a fluid to be metered flows and a pressure responsive instrument having a leading side and a trailing side, of a flow tube in the conduit comprising a converging section followed by successive straight and flaring sections, said straight sections having lengths equal substantially to at least one-quarter of their own diameters, and pipes communicating with regions adjacent to the straight sections and serving to connect such regions to the pressure responsive instrument.

3. A flow tube comprising a converging section followed by successive straight and flaring sections, said flaring sections diverging at an angle of such small value as always to confine a fluid flowing through the flow tube and prevent its free expansion, and said straight sections having lengths equal substantially to at least one-quarter of their own diameters.

4. A flow tube comprising a converging section followed by successive straight and flaring sections, each flaring section diverging from the straight section in advance of it at an angle not greater than five degrees.

5. A flow tube comprising a converging section followed by successive straight and flaring sections, said straight sections having lengths equal substantially to at least one-fourth of their own diameters.

6. A flow tube comprising a converging section followed by successive straight and flaring sections, said straight sections having lengths equal to at least substantially one-fourth of their own diameters, and said flaring sections diverging from the straight section in advance of it at an angle not greater than five degrees.

7. A flow tube comprising a converging section followed by a straight section which in turn merges gradually into a flaring section followed by a straight section, said straight sections being of lengths equal to at least substantially one-fourth of their own diameters.

In witness whereof I have hereunto set my hand this 16th day of October, 1924.

CHARLES F. BULLOCK.